United States Patent
Shibata et al.

(10) Patent No.: US 9,637,048 B2
(45) Date of Patent: May 2, 2017

(54) ILLUMINATION CONTROL SYSTEM (71) Applicant: KOITO MANUFACTURING CO., LTD., Tokyo (JP)

(72) Inventors: Yuichi Shibata, Shizuoka (JP); Satoshi Yamamura, Shizuoka (JP); Takao Muramatsu, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 89 days.

(21) Appl. No.: 14/692,877

(22) Filed: Apr. 22, 2015

(65) Prior Publication Data

US 2015/0307018 A1 Oct. 29, 2015

(30) Foreign Application Priority Data

Apr. 23, 2014 (JP) ................................. 2014-089523

(51) Int. Cl.
*B60Q 1/14* (2006.01)
*F21S 8/10* (2006.01)
*F21W 101/10* (2006.01)

(52) U.S. Cl.
CPC .......... *B60Q 1/143* (2013.01); *F21S 48/1747* (2013.01); *F21S 48/1757* (2013.01); *B60Q 2300/056* (2013.01); *B60Q 2300/314* (2013.01); *B60Q 2300/42* (2013.01); *F21W 2101/10* (2013.01)

(58) Field of Classification Search
CPC .... B60Q 1/143; F21S 48/1747; F21S 48/1757
See application file for complete search history.

(56) References Cited

FOREIGN PATENT DOCUMENTS

| CN | 2716642 Y | 8/2005 | |
|---|---|---|---|
| JP | 4881255 B2 | 2/2012 | |
| JP | 5118564 B2 | 1/2013 | |
| WO | 2011/129105 A1 | 10/2011 | |
| WO | WO 2011129105 A1 * | 10/2011 | ............. B60Q 1/143 |

OTHER PUBLICATIONS

Office Action dated Dec. 20, 2016 issued by the State Intellectual Property Office of the People's Republic of China in counterpart Chinese Patent Application No. 201510192433.6 English Translation.

* cited by examiner

*Primary Examiner* — David V Bruce
(74) *Attorney, Agent, or Firm* — Sughrue Mion, PLLC (57) ABSTRACT

In the event that a predetermined illuminance is obtained by illuminating a certain area with light of a first light quantity, an illumination control system illuminates the area with light of a second light quantity which is larger than the first light quantity at a period, and at periods which follow the period, the illumination control system illuminates the area with light of a third light quantity of light which is smaller than the first light quantity.

7 Claims, 10 Drawing Sheets

ILLUMINATION CONTROL SYSTEM

CROSS-REFERENCE TO RELATED APPLICATION

The present application claims the benefit of priority of Japanese Patent Applications No. 2014-089523, filed on Apr. 23, 2014, which is incorporated herein by reference.

TECHNICAL FIELD

The present invention relates to a system for controlling illumination by a lamp mounted on a vehicle.

BACKGROUND ART

As this type of lamp, a headlamp is known in which a reflector which reflects light emitted from a light source is displaced by an actuator and the direction of the reflected light is changed by an optical system provided in the lamp. The light emitted from the light source and reflected by the reflector illuminates a predetermined area ahead of the vehicle. The illumination light scans within a scanning area which has a wider area than the predetermined area as a result of the actuator displacing the reflector periodically. The scanning is executed at a higher frequency than a frequency at which human eyes can recognize the turning on and off of light shone, whereby it appears to the eyes of occupants in the vehicle that the whole of the scanning area is illuminated (for example, refer to International Unexamined Patent Application Publication No. 2011/129105, Japanese Patent Publication No. 4881255, Japanese Patent Publication No. 5118564).

SUMMARY OF THE INVENTION

An object of the invention is to achieve, in a lamp which executes scanning illumination like the one described above, at least either reducing electric power to be used for the illumination or making the driver feel a sensation that the area ahead of the vehicle is illuminated brightly.

An aspect of the invention is an illumination control system for controlling illumination by a lamp mounted on a vehicle, which is including a light source, a scanning control unit for changing periodically positions of areas which are illuminated by light emitted from the light source, and an illumination control unit for controlling at least one of the light source and the scanning control unit so that in the event that a predetermined illuminance is obtained by illuminating a certain area with light of a first light quantity, the area is illuminated with light of a second light quantity which is larger than the first light quantity in a first period and in a second period which follows the first period the area is illuminated with light of a third light quantity which is smaller than the first light quantity.

The illumination control unit according to the invention makes use of the visual-psychological effect that when catching momentarily a flash of light, human eyes tend to produce a visual sensation of brightness which is brighter than the brightness in reality. For example, an integrated value of a luminous flux is equal between a case where a certain area is illuminated with a first light quantity in a first period and a second period and a case where the area is illuminated with light of a second light quantity which is twice the first light quantity in the first period and in the second period the light quality which illuminates the area is zero. However, in the case of the latter case, since the area is illuminated with the large quantity of light in the first period, the driver can be made to feel that the area is illuminated more brightly even though the light source is not illuminated in the second period. On the other hand, in the event that it is good enough to make the driver feel that in the second period the area is illuminated as bright as in the former case, the quantity of electric power to be used by the light source then can be reduced.

The illumination control system may include an image capturing unit for capturing an image containing the area, and an adjusting unit for adjusting the direction of an optical axis of the image acquiring unit in the first period.

According to this configuration, the adjustment (calibration) of the direction of the image capturing unit is executed by making use of the period of time during which the area ahead of the vehicle is illuminated with the larger light quantity. Consequently, the degree of certainty at which the calibration is executed is improved, and the scanning illumination does not have to be stopped to enable the execution of the calibration.

The image capturing unit may capture the image every time that the first period arrives.

According to this configuration, it is possible to omit an image capturing in the period of time when the area ahead of the vehicle is illuminated with light of the relatively small light quantity. Thus, it is possible to ensure the capturing of an image in the period of time when the area ahead of the vehicle is illuminated with light of the relatively large light quantity, and the amount of data whose degree of necessity is low can be suppressed.

The scanning control unit may include a movable reflecting unit which displaces so as to change a reflecting direction of light emitted from the light source periodically.

According to this configuration, since the scanning illumination is realized by displacing the movable reflecting unit periodically, not only can the number of light sources be reduced, but also electric power needed to drive the light source can be suppressed.

The light source may include a first light source and a second light source both of which can emit light for illuminating the area. As this occurs, the illumination control unit changes a luminous intensity of light emitted from at least one of the first light source and the second light source to illuminate the area with light of the second light quantity.

When the illumination with light of the second light quantity is executed by changing the luminous intensity of light emitted from each of the first light source and the second light source, also in the configuration in which the light quantity emitted from each of the light sources is relatively small, the second light quantity which is relatively large is obtained. When the area is illuminated with light of the second light quantity by changing the luminous intensity of light emitted from either of the first light source and the second light source, the other light source only has to continue to execute the normal operation which it should do, and this can suppress the load which is borne in execution of operation.

Alternatively, the illumination control unit reduces a displacement speed of the movable reflecting unit to illuminate the area with light of the second light quantity.

According to this configuration, in illuminating the area with light of the second light quantity, the luminous intensity of light emitted from the light source does not have to be enhanced. Consequently, the consumed power involved in driving the light source can be suppressed.

MODE FOR CARRYING OUT THE INVENTION

Referring to the accompanying drawings, embodiments of the invention will be described in detail below. In the drawings to be used in the following description, scales are changed as required to show constituent members in appropriate sizes to be viewed. When referred to in the description, "right" and "left" denote a left-to-right direction as viewed from the driver in a driver's seat, unless otherwise described.

Figure 1:
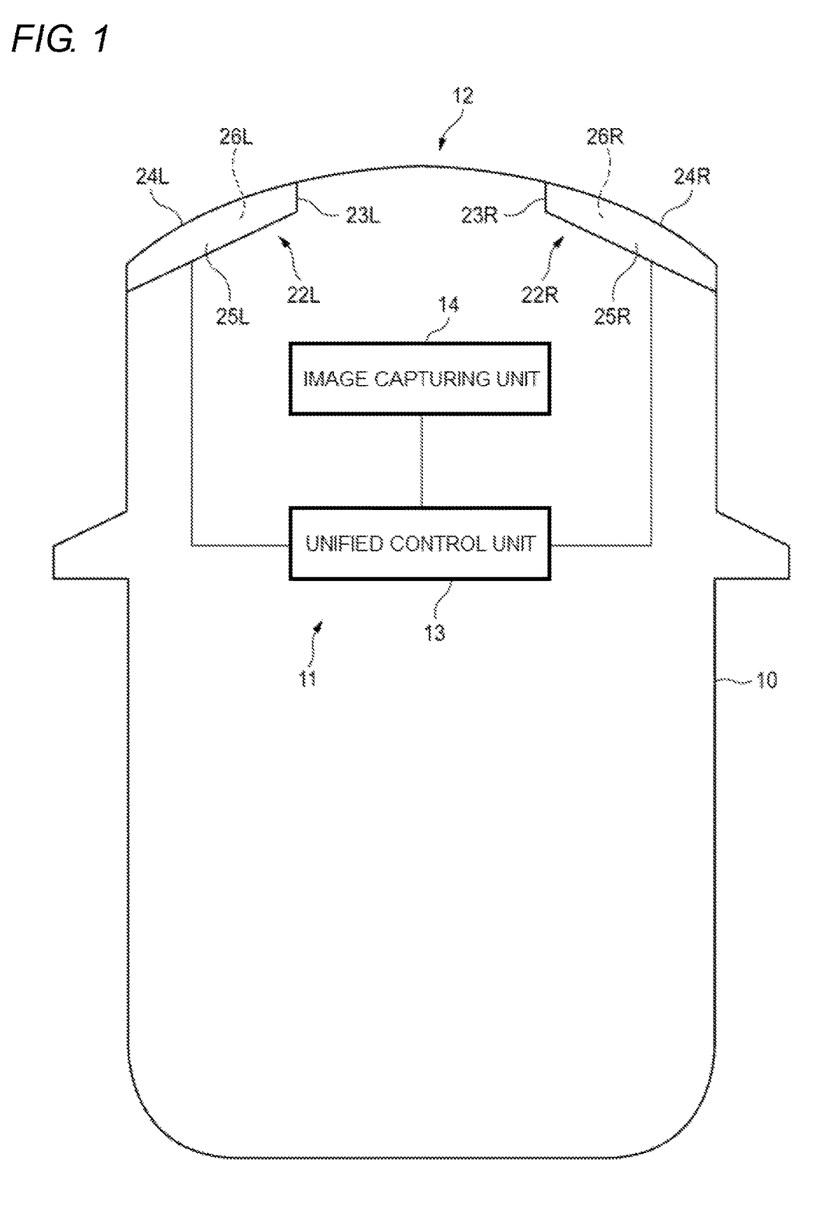
FIG. 1 is a diagram showing an overall configuration of a headlamp control system according to a first embodiment.

FIG. 1 shows schematically an overall configuration of a vehicle 10 on which a headlamp control system 11 (an example of an illumination control system) according to a first embodiment. The headlamp control system 11 controls light distributions of a headlamp system 12 mounted on the vehicle 10. The headlamp control system 11 includes a unified control unit 13 and an image capturing unit 14.

The unified control unit 13 includes a CPU which executes various arithmetic operations, a ROM which stores various programs, a RAM which is used as a working area for storing data and executing the programs, and the like and executes various controls in the vehicle 10.

The image capturing unit 14 captures an image ahead of the vehicle to create image data. As an example of the image capturing unit 14, a camera is raised which includes an image capturing device such as a CCD (Charged Coupled Device) sensor, a CMOS (Complementary Metal Oxide Semiconductor) sensor, and the like. The image capturing unit 14 is connected to the unified control unit 13 so as to communicate therewith. Image data created by the image capturing unit 14 is outputted to the unified control unit 13.

The headlamp system 12 includes a right headlamp unit 22R which is disposed at a right front portion of the vehicle 10 and a left headlamp unit 22L which is disposed at a left front portion of the vehicle 10.

In the right front headlamp unit 22R, a transparent cover 24R is attached to a lamp body 23R to define a lamp compartment 25R. A right lamp unit 26R is accommodated in the lamp compartment 25R. In the left front headlamp unit 22L, a transparent cover 24L is attached to a lamp body 23L to define a lamp compartment 25L. A left lamp unit 26L is accommodated in the lamp compartment 25L.

Figure 2:
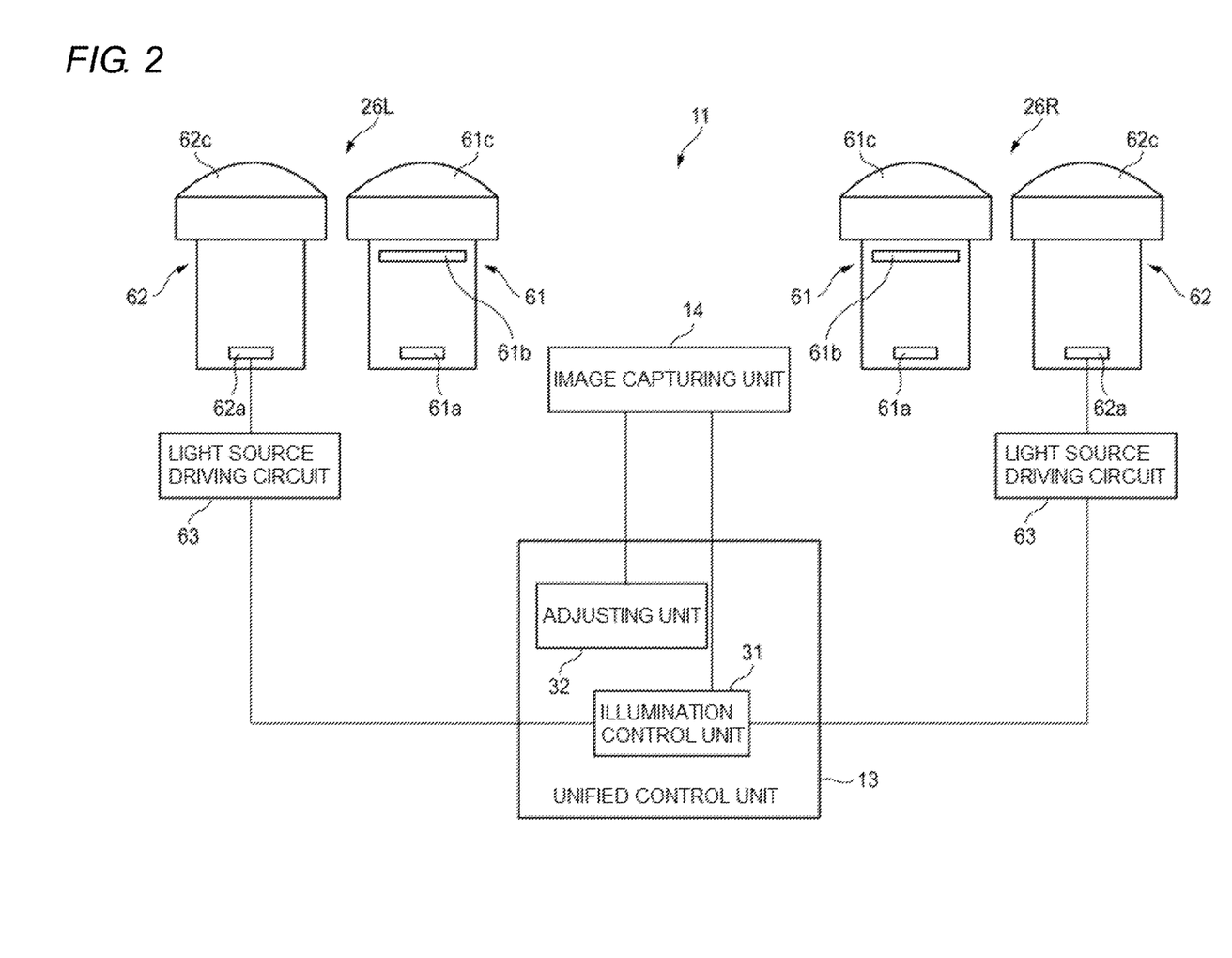
FIG. 2 is a diagram showing in detail the configuration of the headlamp control system.

FIG. 2 is a block diagram showing specifically the headlamp control system 11. The right lamp unit 26R and the left lamp unit 26L each include a low beam unit 61 and a high beam unit 62. Since the right lamp unit 26R and the left lamp unit 26L are configured substantially laterally symmetrical with each other, the right lamp unit 26R will be described, and the repetition of similar descriptions on the left lamp unit 26L will be omitted.

The low beam unit 61 includes a light source 61a, a shade 61b and a projection lens 61c. Part of light emitted from the light source 61a is cut off by the shade 61b. The projection lens 61c is disposed so that at least part of light which passes around the shade 61b passes therethrough. Although illustration is omitted, at least part of light emitted from the light source 61a can be reflected by a suitable reflector.

Figure 3:
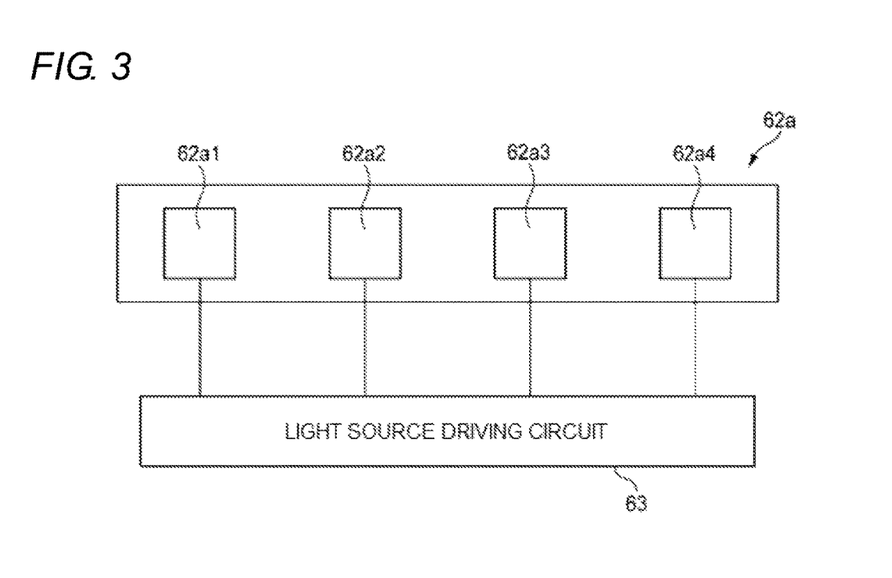
FIG. 3 is a diagram showing the configuration of a light source provided in the headlamp control system.

The high beam unit 62 (an example of a lamp) includes a light source 62a. FIG. 3 shows schematically a configuration of the light source 62a as viewed from the front of the high beam unit 62. The light source 62a is an array of semiconductor light emitting devices in which the plural semiconductor light emitting devices are arranged in a horizontally lateral direction. In this embodiment, four semiconductor light emitting devices 62a1 to 62a4 are shown. The number of semiconductor light emitting devices can be determined as required according to the application thereof. A light emitting diode, a laser diode, an organic EL device and the like are raised as an example of the semiconductor light emitting device.

As shown in FIG. 2, the high beam unit 62 includes a projection lens 62c. The projection lens 62c is disposed so that at least part of light emitted from the light source 62a passes therethrough. Although illustration is omitted, at least part of light emitted from the light source 62a can be reflected by a suitable reflector.

Figure 4:
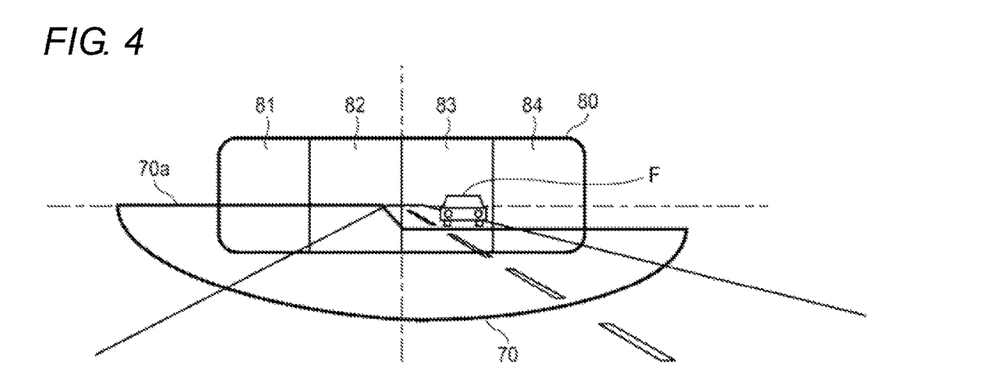
FIG. 4 is a diagram showing a light distribution pattern which is formed by the headlamp control system.

FIG. 4 shows schematically a light distribution pattern which is formed on an imaginary screen disposed ahead of the vehicle 10 by the low beam unit 61 and the high beam unit 62. The light distribution pattern includes a low beam pattern 70 and a high beam pattern 80. The low beam pattern 70 is a light distribution pattern which illuminates a near field ahead of the vehicle 10 so that an oncoming vehicle is not glared. The high beam pattern 80 is a light distribution pattern which illuminates a foreground ahead of the vehicle 10 over a wide and far range.

The low beam pattern 70 has a horizontal cut-off line 70a at an upper edge thereof. The horizontal cut-off line 70a is formed as a result of an edge of the shade 61b being projected by light emitted from the light source 61a.

The high beam pattern 80 includes a plurality of areas 81 to 84. Light emitted from the semiconductor light emitting device 62a1 passes through the projection lens 62c to illuminate the area 81. Similarly, lights emitted from the semiconductor light emitting devices 62a2, 62a3 and 62a4 pass through the projection lens 62c to illuminate the areas 82, 83 and 84, respectively.

As shown in FIG. 2, the unified control unit 13 includes an illumination control unit 31. The illumination control unit 31 is a functional block which is realized by at least either of hardware and software which are mounted on the unified control unit 13. The right lamp unit 26R includes a light source driving circuit 63. The light source driving circuit 63 is connected to the illumination control unit 31 so as to communicate therewith.

As shown in FIG. 3, the light source driving circuit 63 is electrically connected to the semiconductor light emitting devices 62a1 to 62a4. The light source driving circuit 63 can turn on or off independently the semiconductor light emitting devices 62a1 to 62a4 based on a command outputted from the illumination control unit 31.

In this embodiment, the light source driving circuit 63 is designed not to illuminate the semiconductor light emitting devices 62a1 to 62a4 altogether at one time but to illuminate the semiconductor light emitting devices 62a1 to 62a4 one by one or anyone of the semiconductor light emitting devices 62a1 to 62a4 at one time. For example, the light source driving circuit 63 turns on firstly the semiconductor light emitting device 62a1. As this occurs, the other semiconductor light emitting devices are turned off. After a predetermined period of time has elapsed, the semiconductor light emitting device 62a1 is turned off, and only the semiconductor light emitting device 62a2 is turned on. Similarly, only the semiconductor light emitting device 62a3 is turned on, and following this, only the semiconductor light emitting device 62a4 is turned on. By doing this series of operations, the areas 81 to 84 shown in FIG. 4 are sequentially illuminated (scanning illumination). Additionally, the light source driving circuit 63 is designed to repeat this series of operations periodically. Namely, the light source driving circuit 63 changes periodically the area to be illuminated by the light emitted from the light source 62a. By setting the repetition frequency to be higher than a frequency at which human eyes can recognize that light is turned on and off, it appears to the eyes of occupants in the vehicle 10 that all the areas 81 to 84 are illuminated to form the high beam pattern 80.

The illumination control unit 31 recognizes the presence of an oncoming vehicle based on the image captured by the image capturing unit 14 and can control the operation of the light source driving circuit 63 so that the area where the oncoming vehicle is included is not illuminated. In the example shown in FIG. 4, the oncoming vehicle F is included in the area 83. In this case, even though it is a timing at which the area 83 is to be illuminated in the scanning illumination operation, the light source driving circuit 63 is controlled so that the semiconductor light emitting device 62a3 which is configured to illuminate the area 83 is not turned on.

Figure 5A:
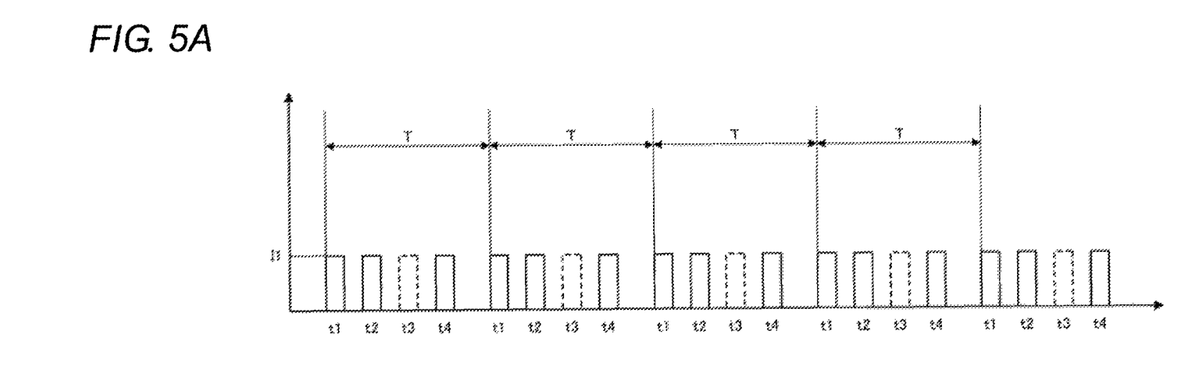
FIGS. 5A and 5B show diagrams illustrating the operation of the headlamp control system.
Figure 5B:
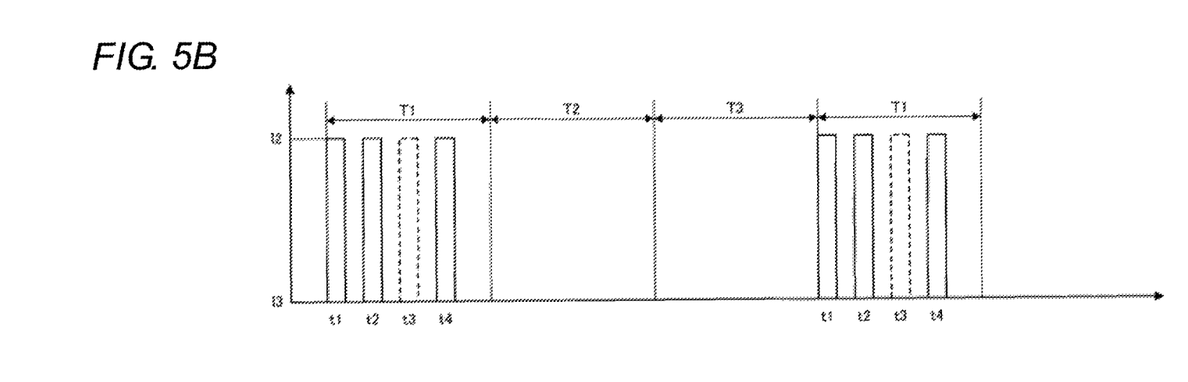

Referring to FIGS. 5A and 5B, the operation of the illumination control unit 31 will be described in detail. FIG. 5A is a time chart when a scanning illumination is executed based on a configuration according to a comparison example in the state shown in FIG. 4. An axis of abscissas represents time, and an axis of ordinates represents a light quantity of light emitted from the light source. In order to form a high beam pattern 80 of a predetermined illuminance, let's assume that the areas 81 to 84 need to be illuminated with light of a first light quantity.

In the configuration according to the comparison example, at time t1, the semiconductor light emitting device 62a1 is turned on so as to emit light of a light quantity I1 which corresponds to the first light quantity. Similarly, at time t2, the semiconductor light emitting device 62a2 is turned on so as to emit light of the light quantity I1 which corresponds to the first light quantity. In this embodiment, since the area 83 includes the oncoming vehicle F, at time t3, the semiconductor light emitting device 62a3 is not turned on. In the event that the image capturing unit 14 detects no oncoming vehicle, as shown by broken lines in the figure, at time t3, the semiconductor light emitting device 62a3 is turned on so as to emit light of the light quantity I1 which corresponds to the first light quantity. At time t4, the semiconductor light emitting device 62a4 is turned on so as to emit light of the light quantity I1 which corresponds to the first light quantity. By repeating this series of operations at periods T, the areas 81 to 84 are illuminated with light of the first light quantity sequentially and periodically.

FIG. 5B is a time chart when a scanning illumination is executed by the illumination control unit 31 according to this embodiment under the same conditions. When the areas 81 to 84 need to be illuminated individually with light of the first light quantity so as to form a high beam pattern 80 of a predetermined illuminance, the illumination control unit 31 controls the light source driving circuit 63 so as to illuminate the areas 81 to 84 with light of a second light quantity which is larger than the first light quantity at a period T1 (an example of a first period) and to illuminate the areas 81 to 84 with light of a third light quantity which is smaller than the first light quantity at periods T2 and T3 (an example of a second period) which follow the period T1.

Namely, at the period T1, at time t1, the semiconductor light emitting device 62a1 is turned on so as to emit light of a light quantity I2 which corresponds to the second light quantity. Similarly, at time t2, the semiconductor light emitting device 62a2 is turned on so as to emit light of the light quantity I2 which corresponds to the second light quantity. In this embodiment, the oncoming vehicle F is included in the area 83, and therefore, at time t3, the semiconductor light emitting device 62a3 is not turned on. In the event that the image capturing unit 14 detects no oncoming vehicle, as shown by broken lines, the semiconductor light emitting device 62a3 is turned on so as to emit light of the light quantity I2 which corresponds to the second light quantity. The semiconductor light emitting device 62a4 is turned on so as to emit light of the light quantity I2 which corresponds to the second light quantity. In this embodiment, the light quantity I2 is three times the light quantity I1.

At the periods T2 and T3 which follow the period T1, none of the semiconductor light emitting devices 62a1 to 62a4 is turned on. Namely, in this embodiment, the light quantity I3 is zero. In this specification, the expression reading "illuminated with light of the third light quantity which is smaller than the first light quantity" means that a case is included where an illumination with no light is executed or the light source is kept turned off.

The illumination control unit 31 according to the embodiment makes use of the visual-psychological effect that when catching momentarily a flash of light, human eyes tend to produce a visual sensation of brightness which is brighter than the brightness in reality. An integrated value of a luminous flux which is obtained at the periods T1 to T3 in FIG. 5B is equal to an integrated value of luminous fluxes which are obtained at the three periods in FIG. 5A. In the case of FIG. 5B, however, since the illumination with the large light quantity is executed at the period T1, the driver can be made to feel a sensation that the bright illumination than the illumination of the comparison example is being executed at the periods T2 and T3 without illuminating the light source 62a at those periods. On the other hand, in case it is good enough for the driver to be made to feel a sensation that the illumination as bright as the illumination of the comparison example is being executed, the quantity of electric power to be used for illumination by the light source 62a can be reduced.

Consequently, the value of the light quantity I2, the value of light quantity I3, the number of periods at which the light source 62a is caused to emit light of the light quantity I2 and the number of periods at which the light source 62a is caused to emit light of the light quantity I3 can be determined as required according the specification.

While the right lamp unit 26R has been described heretofore, the description can also be applied to the left light unit 26L. Namely, the areas 81 to 84 shown in FIG. 4 can individually be illuminated with light emitted from the light source 62a (an example of a first light source) provided in the right lamp unit 26R and light emitted from the light source 62a (an example of a second light source) provided in the left lamp unit 26L.

In illuminating the areas 81 to 84 individually with light of the second light quantity, the luminous intensity of light emitted from at least either of the light source 62a provided in the right lamp unit 26R and the light source 62a provided in the left lamp unit 26L only has to be changed.

For example, as a first approach, the light source 62a of the right lamp unit 26R and the light source 62a of the left lamp unit 26L are caused to execute the operations shown in FIG. 5B, whereby light of the second light quantity can be obtained. According to this configuration, even in the event that the light quantity emitted from each light source 62a is relatively small, the second light quantity can be obtained relatively large.

As a second approach, the light source 62a of the right lamp unit 26R is caused to execute the operations shown in FIG. 5A, while the light source 62a of the left lamp unit 26L is caused to execute the operations shown in FIG. 5B, whereby the second light quantity can also be obtained. Alternatively, as a third approach, the light source 62a of the right lamp unit 26R is caused to execute the operations shown in FIG. 5B, while the light source 62a of the left lamp unit 26L is caused to execute the operations shown in FIG. 5A, whereby the second light quantity can also be obtained. According to these configurations, one of the light sources only has to be made to continue executing the constant operation, whereby the load can be suppressed which is borne in execution of the operation.

As shown in FIG. 2, the unified control unit 13 includes an adjusting unit 32. The adjusting unit 32 is connected to the image capturing unit 14 so as to communicate therewith. The adjusting unit 32 is realized by at least one of the hardware and the software which are mounted in the unified control unit 13 and is a functional block which adjusts (executes a calibration of) the direction of an optical axis of the image capturing unit 14. The adjusting unit 32 is designed to execute the calibration at the period T1 (that is, the period at which the areas 81 to 84 are illuminated with light of the second light quantity).

According to this configuration, the calibration of the image capturing unit 14 can be executed by making use of the period at which the foreground ahead of the vehicle is illuminated with the larger light quantity. Consequently, the degree of certainty at which the calibration is executed is improved, and the scanning illumination does not have to be stopped to enable the execution of the calibration.

The image capturing unit 14 does not have to capture an image ahead of the vehicle 10 continuously. The image capturing unit 14 can be designed to capture an image ahead of the vehicle 10 periodically. Specifically, the image capturing unit 14 can be designed so as to capture an image every time that the period T1 arrives.

According to this configuration, capturing an image in the period at which the foreground of the vehicle 10 is not illuminated (or illuminated with light of a small light quantity) can be omitted. Thus, not only can an image be captured in an ensured fashion during the period of time during which the foreground of the vehicle 10 is illuminated with light of a large light quantity, but also the quantity of data whose degree of necessity is low can be suppressed.

Next, referring to FIG. 6, a headlamp control system 111 according to a second embodiment will be described. Like reference numerals will be given to substantially like constituent elements to the constituent elements of the headlamp control system 11 according to the first embodiment, the repetition of similar descriptions will be omitted.

The headlamp control system 111 includes a right lamp unit 126R and a left lamp unit 126L. The right lamp unit 126R and the left lamp unit 126L each include a high beam unit 162. Since the right lamp unit 126R and the left lamp unit 126L are configured substantially laterally symmetrical with each other, the right lamp unit 126R will be described, and the repetition of similar descriptions on the left lamp unit 126L will be omitted.

The high beam unit 162 (an example of a lamp) includes a light source 162a, a reflector 162b, and a projection lens 162c. The light source 162a is a single semiconductor light emitting device. The reflector 162b includes a movable reflecting unit which can be displaced so as to change a reflecting direction of light emitted from the light source 162a periodically. The projection lens 162c is disposed so as to allow at least part of light reflected by the reflector 162b to pass therethrough.

The high beam unit 162 includes a reflector driving unit 163. The reflector driving unit 163 (an example of a scanning control unit) displaces the movable reflecting unit of the reflector 162b periodically to thereby change the position of the area on to which light which passes through the projection lens 162c is shone periodically. Configuration examples of movable reflecting units are shown in FIGS. 7A and 7B.

Figure 7A:
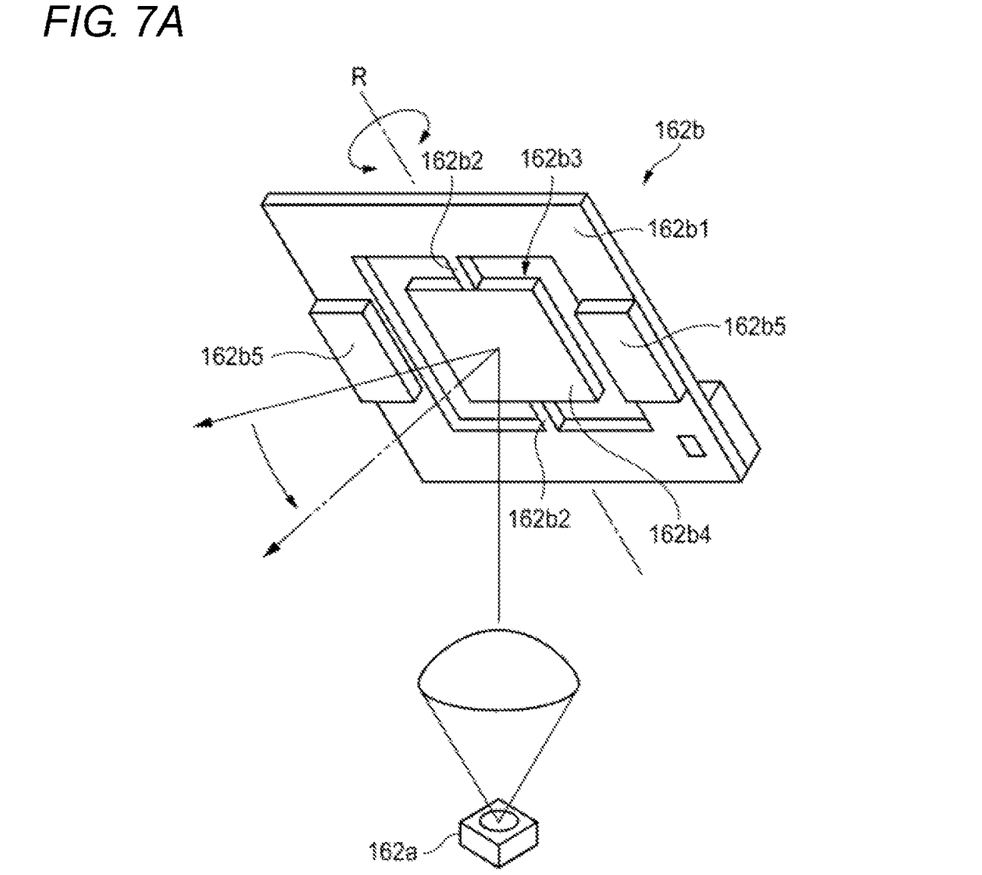
FIGS. 7A and 7B show diagrams showing configuration examples of movable reflecting units which are to be provided in the headlamp control system shown in FIG. 6.

FIG. 7A shows schematically a so-called MEMS reflector 162b. In this reflector 162b, a movable member 162b3 is supported on a frame-shaped base board 162b1 via torsion bars 162b2. A mirror 162b4 is formed on a surface of the movable member 162b3. A coil, not shown, is provided in an interior of the movable member 162b3. A pair of permanent magnets 162b5 are provided to sides of the movable member 162b3. The reflector driving unit 163 controls the magnitude and direction of an electric current which flows in the coil in a magnetic field which is at right angles to the torsion bars 162b2. This enables the movable member 162b3 to rotate together with the mirror 162b4 about an axis R, whereby a reflecting direction of light emitted from the light source 162a is changed periodically. This type of reflector 162b is described in, for example, Japanese Patent Publication No. 5118564, and therefore, a more detailed description of the reflector will be omitted here.

Figure 7B:
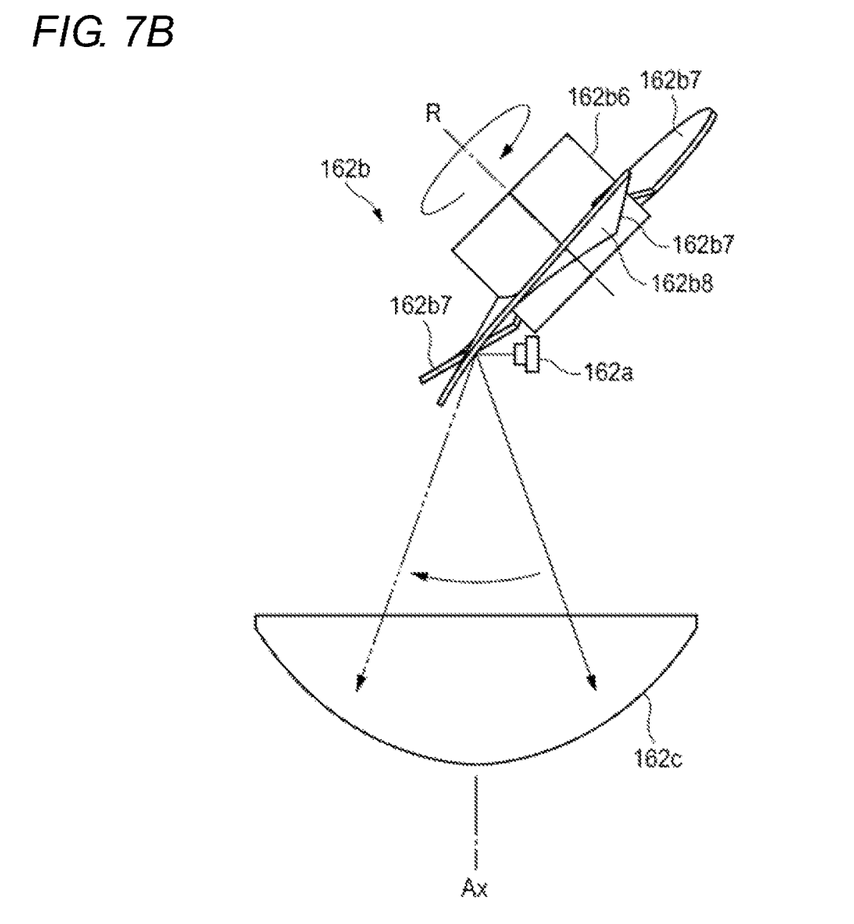

FIG. 7B shows schematically a so-called rotational reflector 162b. This reflector 162b includes a rotational portion 162b6 and a plurality of blades 162b7. The rotational portion 162b6 exhibits a cylindrical shape. The plurality of blades 162b7 are aligned at equal intervals in a circumferential direction of the rotational portion 162b6 on an outer circumferential surface of the rotational portion 162b6. A mirror 162b8 is formed on a surface of each blade 162b7. The reflector driving unit 163 rotates the rotational portion 162b6 in one direction about an axis R. A reflecting surface of each mirror 162b8 intersects an optical axis Ax of the projection lens 162c and extends so that the intersecting direction changes as the rotational portion 162b6 rotates. This changes the reflecting direction of light emitted from the light source 162a periodically. This type of reflector 162b is described in, for example, International Unexamined Patent Application Publication No. 2011/129105, and therefore, a more detailed description of the reflector will be omitted here.

Figure 6:
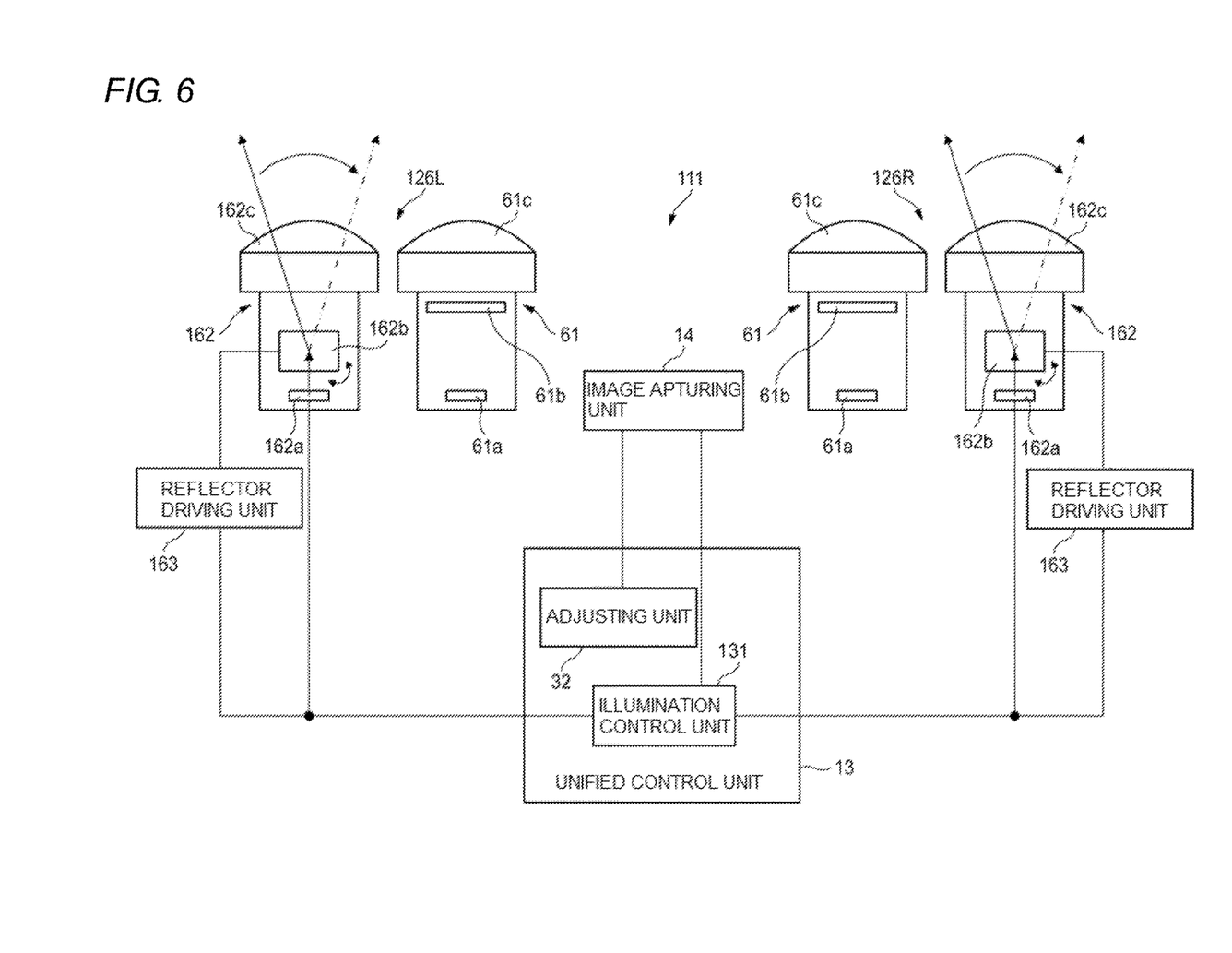
FIG. 6 is a diagram showing in detail a headlamp control system according to a second embodiment.

As shown in FIG. 6, the unified control unit 13 includes an illumination control unit 131. The illumination control unit 131 is a functional block which is realized by at least one of hardware and software which are mounted in the unified control unit 13. The illumination control unit 131 is connected to the light source 162a and the reflector driving unit 163 so as to communicate therewith.

Figure 8A:
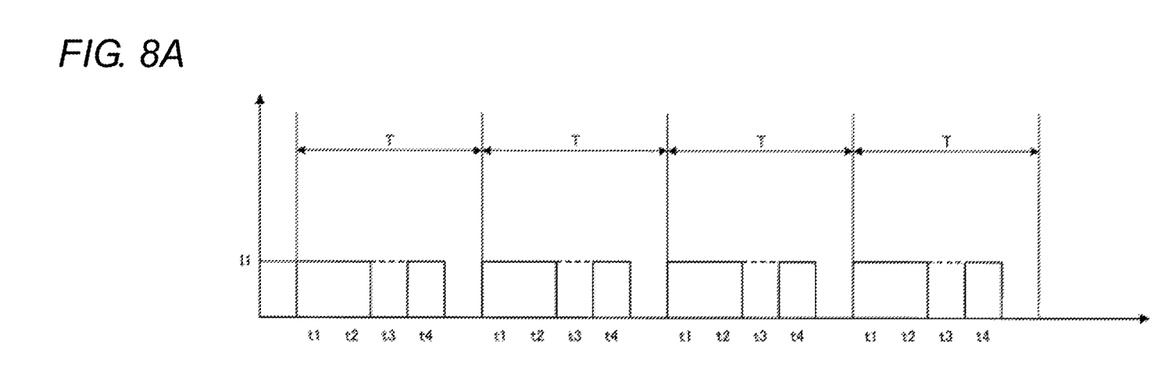
FIGS. 8A and 8B show diagrams illustrating an operation example of the headlamp control system shown in FIG. 6.
Figure 8B:
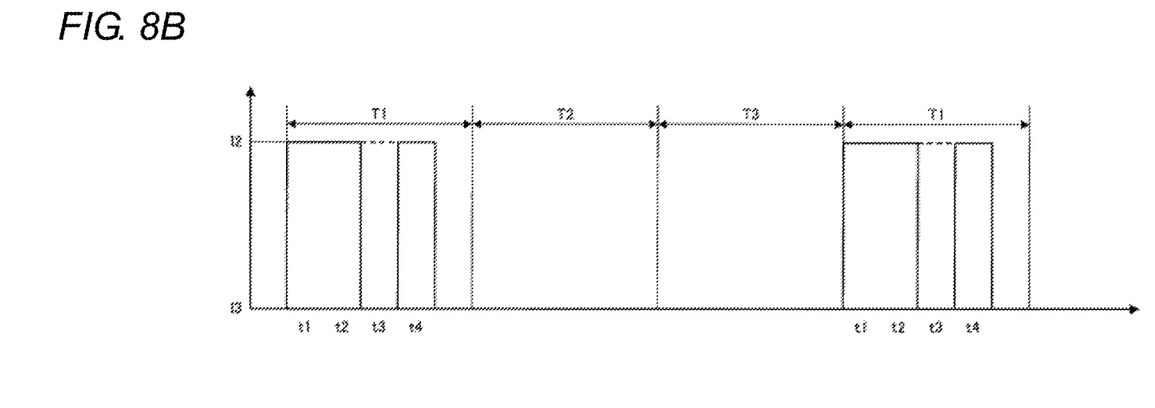

Referring to FIGS. 8A and 8B, the operation of the illumination control unit 131 will be described in detail. FIG. 8A is a time chart when a scanning illumination is executed based on a configuration of a comparison example in the state shown in FIG. 4. An axis of abscissas represents time, and an axis of ordinates represents a light quantity of light emitted from the light source. In order to form a high beam pattern 80 of a predetermined illuminance, let's assume that the areas 81 to 84 need to be illuminated with light of a first light quantity.

In the configuration according to the comparison example, at time t1, the light source 162a is turned on so as to emit light of a light quantity I1 which corresponds to the first light quantity. The movable reflecting unit of the reflector 162b is moved to a position where to reflect the light emitted from the light source 162a so as to illuminate the area 81. At time t2, with the light source 162a kept turned on, the movable reflecting unit of the reflector 162b is moved to a position where to reflect the light emitted from the light source 162a so as to illuminate the area 82. In this example, since the oncoming vehicle F is included in the area 83, at time t3, the light source 162a is turned off. In the event that the image capturing unit 14 detects no oncoming vehicle, the light source 162a is kept turned on as shown by broken lines in the figure, and at time t3 the movable reflecting unit of the reflector 162b is moved to a position where to reflect the light emitted from the light source 162a so as to illuminate the area 83. At time t4, the light source 162a is turned on again (in the event that the light source 162a is turned on at time t3, the light source 162a is kept turned on). The movable reflecting unit of the reflector 162b is moved to a position where to reflect the light emitted from the light source 162a so as to illuminate the area 84. This series of operations is repeated at a period T, whereby the areas 81 to 84 are illuminated with light of the first light quantity sequentially and periodically.

FIG. 8B is a time chart when a scanning illumination is executed by the illumination control unit 131 according to this embodiment under the same conditions. When the areas 81 to 84 need to be illuminated individually with light of the first light quantity of light so as to form a high beam pattern 80 of a predetermined illuminance, the illumination control unit 131 controls at least one of the light source 162a and the reflector driving unit 163 so as to illuminate the areas 81 to 84 with light of a second light quantity which is larger than the first light quantity at a period T1 (an example of a first period) and to illuminate the areas 81 to 84 with light of a third light quantity which is smaller than the first light quantity at periods T2 and T3 (an example of a second period) which follow the period T1.

Namely, at the period T1, at time t1, the light source 162a is turned on so as to emit light of a light quantity I2 which corresponds to the second light quantity. The movable reflecting unit of the reflector 162b is moved to a position where to reflect the light emitted from the light source 162a so as to illuminate the area 81. At time t2, with the light source 162a kept turned on, the movable reflecting unit of the reflector 162b is moved to a position where to reflect the light emitted from the light source 162a so as to illuminate the area 82. In this example, since the oncoming vehicle F is included in the area 83, at time t3, the light source 162a is turned off. In the event that the image capturing unit 14 detects no oncoming vehicle, the light source 162a is kept turned on as shown by broken lines in the figure, and at time t3 the movable reflecting unit of the reflector 162b is moved to a position where to reflect the light emitted from the light source 162a so as to illuminate the area 83. At time t4, the light source 162a is turned on again (in the event that the light source 162a is turned on at time t3, the light source 162a is kept turned on). The movable reflecting unit of the reflector 162b is moved to a position where to reflect the light emitted from the light source 162a so as to illuminate the area 84. This enables the areas 81 to 84 to be illuminated with light of the second light quantity sequentially. In this embodiment, the light quantity I2 is three times the light quantity I1.

At the periods T2 and T3 which follow the period T1, the light source 162a is not turned on. Namely, in this embodiment, the light quantity I3 is zero.

In the illumination control unit 131 according to this embodiment, too, the visual-psychological effect is made use of similarly as done in the illumination control unit 31 according to the first embodiment. An integrated value of a luminous flux which is obtained at the periods T1 to T3 in FIG. 8B is equal to an integrated value of luminous fluxes which are obtained at the three periods in FIG. 8A. In the case of FIG. 8B, however, since the illumination with the large light quantity is executed at the period T1, the driver can be made to feel a sensation that the bright illumination than the illumination of the comparison example is being executed at the periods T2 and T3 without illuminating the light source 162a at those periods. On the other hand, in case it is good enough for the driver to be made to feel a sensation that the illumination as bright as the illumination of the comparison example is being executed, the quantity of electric power to be used for illumination by the light source 162a can be reduced.

Consequently, the value of the light quantity I2, the value of light quantity I3, the number of periods at which the light source 162a is caused to emit light of the light quantity I2 and the number of periods at which the light source 162a is caused to emit light of the light quantity I3 can be determined as required according the specification.

In addition, according to the configuration of this embodiment, since the scanning illumination is executed by displacing periodically the movable reflecting unit of the reflector 162b, not only can the number of light sources be reduced, but also the quantity of electric power to be used to drive the light source can be suppressed.

While the right lamp unit 126R has been described heretofore, the description can also be applied to the left light unit 126L. Namely, the areas 81 to 84 shown in FIG. 4 can individually be illuminated with light emitted from the light source 162a (an example of a first light source) provided in the right lamp unit 126R and light emitted from the light source 162a (an example of a second light source) provided in the left lamp unit 126L. In illuminating the areas 81 to 84 individually with the second light quantity and the third light quantity, the light quantity of light emitted from at least one of the light source 162a of the right lamp unit 126R and the light source 162a of the left lamp unit 126L should be changed.

In this embodiment, light of the second light quantity can also be obtained by reducing the displacing speed of the movable reflecting unit of the reflector 162b. This will be described by reference to FIGS. 9A and 9B.

Figure 9A:
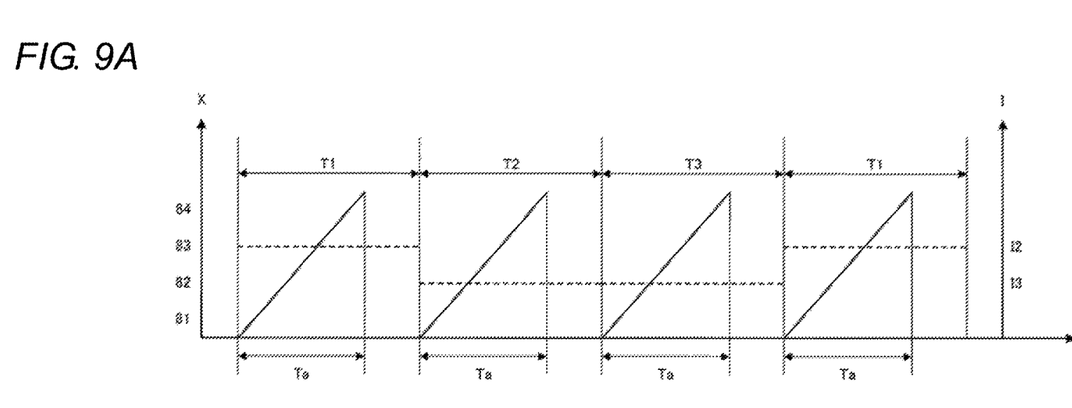
FIGS. 9A and 9B show diagrams illustrating another operation example of the headlamp control system shown in FIG. 6.

FIG. 9A is a time chart which illustrates the operations illustrated at FIG. 8B in a different form. An axis of abscissas represents time, and a left axis of ordinates represents the positions of the areas which are illuminated with the light reflected by the reflector 162b. Numerals 81 to 84 correspond to the numbers of the areas shown in FIG. 4. A right axis of ordinates represents a light quantity of light emitted from the light source 162a.

In this case, as shown by solid lines in the figure, the displacing speed of the movable reflecting unit of the reflector 162b is constant at the periods T1 to T3. Specifically, the movable reflecting unit of the reflector 162b is displaced so that a time taken from when the reflected light starts illuminating the area 81 until the reflected light ends illuminating the area 84 becomes Ta.

On the other hand, as shown by broken lines in the figure, the light quantity of light emitted from the light source 162a changes with period. At the period T1, light of the light quantity I2 is emitted from the light source 162a so as to illuminate the areas 81 to 84 individually with the second light quantity. At the periods T2 and T3, light of the light quantity I3 is emitted from the light source 162a so as to illuminate the areas 81 to 84 individually with the third light quantity.

Figure 9B:
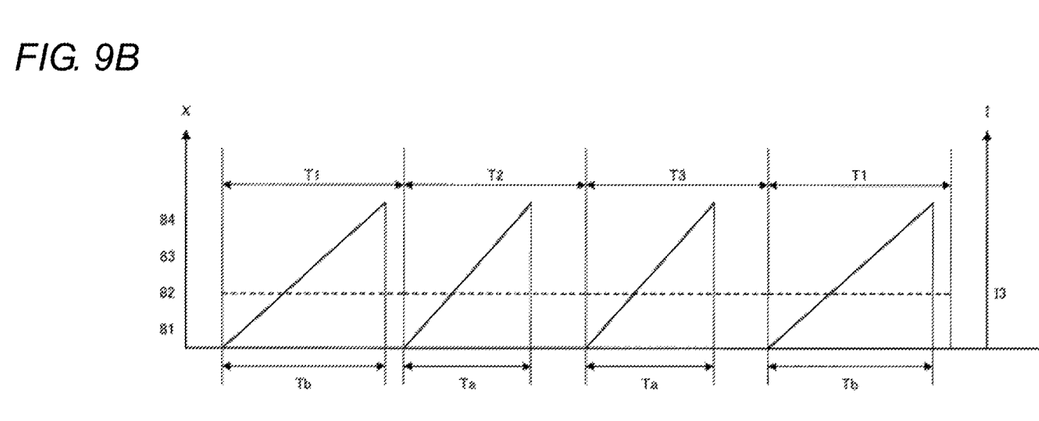

FIG. 9B is a time chart showing different operations to obtain the same results. As shown by solid lines in the figure, compared with the periods T2 and T3, the displacing speed of the reflector 162b is reduced at the period T1. Specifically, the movable reflecting unit of the reflector 162b is displaced so that the time taken from when the reflected light starts illuminating the area 81 until the reflected light ends illuminating the area 84 becomes a time Tb which is longer than the time Ta.

On the other hand, as shown by broken lines in the figure, at each of the periods T1 to T3, the light quantity of light emitted from the light source 162a remains constant at the light quantity I3. However, since the areas 81 to 84 which have the same surface area are scanned over a long period of time, the apparent brightness is enhanced. Namely, it is possible to obtain a similar visual result to one obtained by scanning the areas 81 to 84 with the light quantity I2 which is larger than the light quantity I3 over the time Ta.

According to this configuration, in illuminating the areas 81 to 84 individually with light of the second light quantity, the luminous intensity of light emitted from the light source 162a does not have to be enhanced. Consequently, the consumed power in association with driving the light source 162a can be suppressed.

In this embodiment, too, an adjusting unit 32 is designed to execute a calibration at the period T1 (that is, the period at which the areas 81 to 84 are illuminated individually with light of the second light quantity).

In particular, in this embodiment, the degree of certainty at which the calibration is executed can be enhanced by changing the displacing speed of the movable reflecting unit of the reflector 162b within the period T1. This will be described by reference to FIGS. 10A and 10B.

Figure 10A:
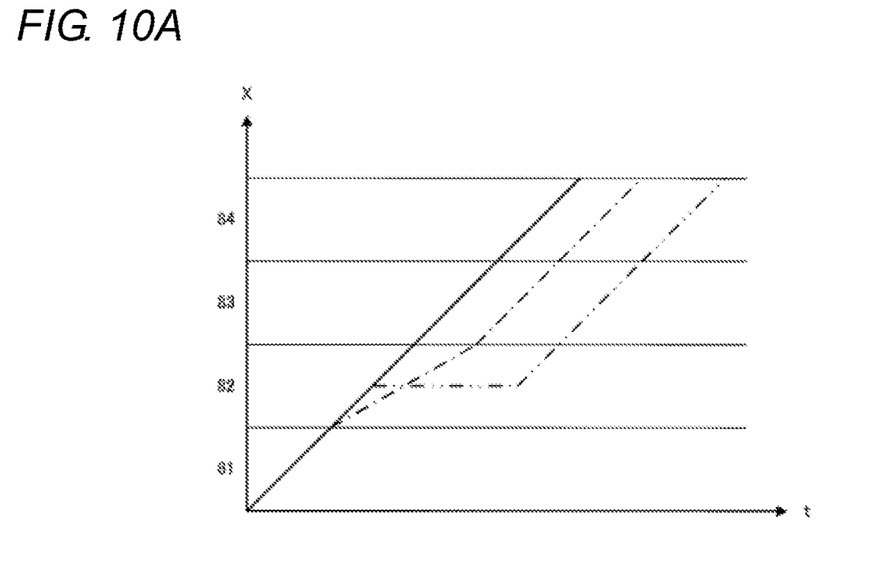
FIGS. 10A and 10B show diagrams illustrating a further operation example of the headlamp control system shown in FIG. 6.
Figure 10B:
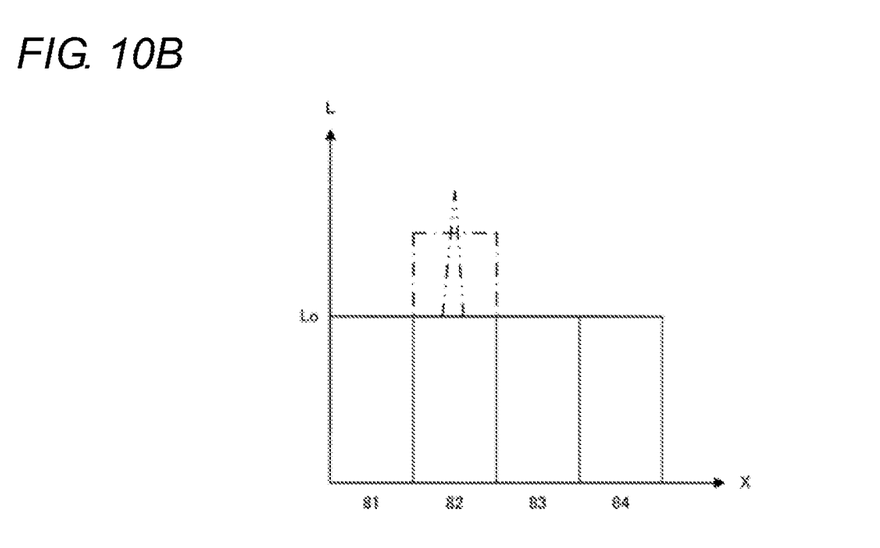

In FIG. 10A, an axis of abscissas represents time, and an axis of ordinates represents the positions of the areas which are illuminated with the light reflected by the reflector 162b. Numerals 81 to 84 correspond to the numbers of the areas shown in FIG. 4. An axis of abscissas in FIG. 10B corresponds to the axis of ordinates in FIG. 10A. An axis of ordinates in FIG. 10B represents an illuminance of each of the areas 81 to 84.

A solid line in FIG. 10A corresponds to the operations at the period T1 at FIG. 8B. Namely, the displacing speed of the movable reflecting unit of the reflector 162b is constant from when the reflected light starts illuminating the area 81 until the reflected light ends illuminating the area 84. In this case, as shown by solid lines in FIG. 10B, the areas 81 to 84 are illuminated individually at a constant illuminance Lo which corresponds to the second light quantity.

As shown by an alternate short and long dash line in FIG. 10A, the displacing speed of the movable reflecting unit of the reflector 162b may be reduced at anyone of the areas 81 to 84 (at the area 82 in the illustrated example). As this occurs, as shown by alternate short and long dash lines in FIG. 10B, only the area 82 comes to have a higher illuminance which is higher than the illuminance Lo which corresponds to the second light quantity.

Alternatively, as shown by a chain double-dashed line in FIG. 10A, the movable reflecting unit of the reflector 162b may be stopped temporarily at anyone of the areas 81 to 84 (at the area 82 in the illustrated example). Namely, when used in this specification, the expression reading "the displacing speed of the movable reflecting unit is reduced" means that a case where the displacing speed is zero is included. As this occurs, as shown by chain double-dashed lines in FIG. 10B, an area where the illuminance becomes higher than that of the case shown by the alternate short and long dash lines can be formed locally within the area 82.

According to the cases described above, since the area where the illuminance becomes higher can be formed within the period T1, the calibration can be executed in a more ensured fashion by making use of that area.

The embodiments which have been described heretofore are intended to facilitate the understanding of the invention and are not intended to limit the invention. It is obvious that modifications and/or improvements can be made without departing from the spirit and scope of the invention and that equivalents thereof are also included in the invention.

In the embodiments described above, the unified control unit 13 includes the illumination control unit 31, 131. However, at least part of the function of the illumination control unit 31, 131 can be executed by the control unit which is provided as part of each of the right lamp unit 26R, 126R and the left lamp unit 26L, 126L in the lamp compartments 25R, 25L.

In the individual embodiments described above, the high beam unit 62, 162 for forming the high beam pattern 80 is described as the lamp to which the invention is applied. However, the invention can be applied to a suitable lamp which includes the configuration in which the areas to be illuminated by the light emitted from the light source are changed periodically. For example, the invention can be applied to a lamp which creates a predetermined symbol on a road surface by turning on and off a light source while scanning the road surface with light emitted from the light source.

The invention claimed is:
1. An illumination control system for controlling illumination by a lamp mounted on a vehicle, comprising:
 a light source;
 a scanning control unit for changing periodically positions of areas which are illuminated by light emitted from the light source; and
 an illumination control unit for controlling at least one of the light source and the scanning control unit so that in the event that a predetermined illuminance is obtained by illuminating a certain area with light of a first light quantity, the area is illuminated with a second quantity of light which is larger than the first quantity in a first period, and in a second period which follows the first period the area is illuminated with light of a third light quantity which is smaller than the first light quantity, wherein the durations of the first period and the second period are of such a time that it appears to human occupants of the vehicle that the area is illuminated with a quantity of light that is at least equal to the quantity of light of the first light quantity during both the first period and the second period.

2. The illumination control system according to claim 1, comprising:

an image capturing unit for capturing an image containing the area; and an adjusting unit for adjusting the direction of an optical axis of the image acquiring unit in the first period.

3. The illumination control system according to claim 2, wherein the image capturing unit captures the image every time that the first period arrives.

4. The illumination control system according to claim 1, wherein the scanning control unit comprises a movable reflecting unit which displaces so as to change a reflecting direction of light emitted from the light source periodically.

5. The illumination control system according to claim 4, wherein the illumination control unit reduces a displacement speed of the movable reflecting unit to illuminate the area with light of the second light quantity.

6. The illumination control system according to claim 1, wherein the light source includes a first light source and a second light source both of which can emit light for illuminating the area, and wherein the illumination control unit changes a luminous intensity of light emitted from at least one of the first light source and the second light source to illuminate the area with light of the second light quantity.

7. The illumination control system according to claim 1, wherein the third light quantity is a light quantity of zero.

* * * * *